(12) United States Patent
Ren et al.

(10) Patent No.: US 10,447,071 B2
(45) Date of Patent: Oct. 15, 2019

(54) BACKUP POWER SOURCE ASSEMBLY, LAMP ASSEMBLY, LIGHTING SYSTEM AND INSTALLING METHOD THEREOF

(71) Applicant: GE LIGHTING SOLUTIONS, LLC, East Cleveland, OH (US)

(72) Inventors: Junqi Ren, Shanghai (CN); Shouyong Zhou, Shanghai (CN); Bing Zhang, Shanghai (CN); Honglei Gao, Shanghai (CN); Hui Li, Shanghai (CN); Cuijuan Zhou, Shanghai (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/839,504

(22) Filed: Dec. 12, 2017

(65) Prior Publication Data

US 2018/0166912 A1    Jun. 14, 2018

(30) Foreign Application Priority Data

Dec. 14, 2016 (CN) .......................... 2016 1 1152366

(51) Int. Cl.
*H05B 37/00* (2006.01)
*H05B 39/00* (2006.01)
(Continued)

(52) U.S. Cl.
CPC ...... *H02J 9/02* (2013.01); *F21S 9/02* (2013.01); *F21V 23/023* (2013.01); *F21V 23/06* (2013.01);
(Continued)

(58) Field of Classification Search
CPC ............ G09G 3/22; G09G 2320/0233; H05B 37/0272; H05B 41/00; H05B 41/36;
(Continued)

(56) References Cited

U.S. PATENT DOCUMENTS

| 2004/0001337 A1 | 1/2004 | Defouw et al. |
| 2006/0006820 A1* | 1/2006 | Roseman ............... A01G 7/045 |
| | | 315/312 |

(Continued)

FOREIGN PATENT DOCUMENTS

| CN | 202013711 U | 10/2011 |
| JP | 5885941 B2 | 3/2016 |
| WO | 2010/016453 A1 | 2/2010 |

*Primary Examiner* — Minh D A
(74) *Attorney, Agent, or Firm* — Buckley, Maschoff & Talwalkar, LLC

(57) ABSTRACT

The present invention discloses a lighting system, comprising: an emergency power supply assembly, a lighting assembly, at least one first electrical connection for connecting the emergency power supply assembly, and at least one second electrical connection for connecting the lighting assembly, wherein the at least one first electrical connector and the at least one second electrical connector work with each other to form a quick connection between the emergency power supply assembly and the lighting assembly. The present invention also discloses an emergency power supply assembly. The present invention further discloses a lighting assembly. The present invention also discloses a lighting system installation method.

5 Claims, 4 Drawing Sheets

(51) Int. Cl.
*H02J 9/02* (2006.01)
*H05B 37/04* (2006.01)
*H05B 37/02* (2006.01)
*H02J 9/06* (2006.01)
*F21S 9/02* (2006.01)
*F21V 23/06* (2006.01)
*F21V 23/02* (2006.01)
*F21V 23/00* (2015.01)
*F21V 23/04* (2006.01)

(52) U.S. Cl.
CPC .............. *H02J 9/06* (2013.01); *H02J 9/061* (2013.01); *H05B 37/02* (2013.01); *H05B 37/04* (2013.01); *F21V 23/008* (2013.01); *F21V 23/04* (2013.01)

(58) Field of Classification Search
CPC .... H05B 33/0815; B61L 5/1881; F02P 1/005; F02P 15/003; G02F 1/01
See application file for complete search history.

(56) References Cited

U.S. PATENT DOCUMENTS

| | | | |
|---|---|---|---|
| 2008/0055801 A1* | 3/2008 | O'Rourke | H02H 7/26 361/49 |
| 2009/0244880 A1 | 10/2009 | Rapeanu et al. | |
| 2011/0062888 A1* | 3/2011 | Bondy | H05B 33/0815 315/294 |
| 2013/0234595 A1* | 9/2013 | Martin | H05B 33/0884 315/87 |
| 2013/0328401 A1* | 12/2013 | Chen | H02J 9/061 307/64 |

* cited by examiner

BACKUP POWER SOURCE ASSEMBLY, LAMP ASSEMBLY, LIGHTING SYSTEM AND INSTALLING METHOD THEREOF

TECHNICAL FIELD

The present invention relates to an emergency power supply assembly, a lighting assembly, a lighting system, and a method of mounting the same.

BACKGROUND

Embedded lighting has been widely used in commercial, residential and public buildings. These fixtures are usually flush mounted on walls or ceilings, and contain light sources such as incandescent lamps or LEDs. In addition, embedded lighting fixtures are often equipped with an emergency power supply that is separate from the lighting fixtures, to provide temporary power to the lighting fixtures in an emergency, such as a power failure. However, the wiring between the existing emergency power supply and lighting fixtures is very complex, which requires installation by on-site professional electricians. In addition, manual wiring inside the wall or on the ceiling is often required, which can result in a great deal of additional time and labor. Furthermore, in the case of malfunctioning lighting fixtures or emergency power supplies, more time and labor is required through on-site maintenance, which can also bring security risks.

Thus, it is desirable to provide new and improved lighting systems and corresponding mounting methods that enable quick, safe and easy installation between lighting fixtures and emergency power supplies.

SUMMARY OF THE INVENTION

One aspect of the present invention is a lighting system, comprising: an emergency power supply assembly, a lighting assembly, at least one first electrical connection for connecting the emergency power supply assembly, and at least one second electrical connection for connecting to the lighting assembly, wherein the said first electrical connector and the said second electrical connector cooperate with each other so that a quick connection is formed between the emergency power supply assembly and the lighting assembly.

A second aspect of the present invention is an emergency power supply assembly, comprising: an emergency power supply for providing backup power; and a splitter for splitting wires to form different functional circuits, comprising: A first connection for connecting to a lighting assembly and a second connection for connecting to the emergency power supply; and at least one electrical connection for connecting the first connection to the quick connection formed between the first connection and the lighting assembly.

A third aspect of the present invention is a lighting assembly, comprising: a light emitting unit for providing a light source; a driving unit connected to an emergency power supply assembly for controlling the emergency power supply assembly to provide power to the light emitting unit; at least one electrical connector for connecting the driving unit to form a quick connection between the drive unit and the emergency power supply assembly; and a mounting base including a reserved hole for a switch for emergency power testing.

A fourth aspect of the present invention is a method of installing a lighting system, comprising: the electrical connectors connecting each of the electrical connectors of the lighting assembly to each of the electrical connectors of the complementary emergency power supply assembly; connecting the emergency power supply assembly to an external power source; configuring the emergency power supply assembly on a wall or ceiling; and installing the lighting assembly on a wall or ceiling.

BRIEF DESCRIPTION OF THE DRAWINGS

The following detailed description with reference to the accompanying drawings may help to understand the features, aspects and advantages of the invention, wherein.

DETAILED DESCRIPTION

One or more embodiments of the present invention are described below. It must first be pointed out that, in the specific embodiments of the present invention that will be described, it is to be understood that all of the features of the actual embodiments will not be described in detail in order to provide a concise description in the detailed description of these embodiments. It should be appreciated that, during the actual implementation of any one of the embodiments, just as during the process of any one construction project or design project, in order to achieve the specific objective of the developer, or to meet system-related or business-related limitations, a variety of specific decisions are often made, which will also change from one implementation to another. In addition, it is to be understood that, while the efforts made in this development process may be complex and lengthy, to those of ordinary skill in the art in connection with the present invention, some of the design, manufacturing or production changes made on the basis of the technical contents disclosed in the present invention, are only conventional technical means and should not be construed as an inadequate disclosure of the present invention.

Unless otherwise defined, the technical and scientific terms used in the claims and the specification are as they are usually understood by those skilled in the art to which the present invention pertains. "First", "second" and similar words used in this specification and in the claims do not denote any order, quantity or importance, but are merely intended to distinguish between different constituents. The terms "one", "a" and the like are not meant to be limiting, but rather denote the presence of at least one. "Or" includes any or all of the listed items. The terms "including", "comprising" and the like are intended to mean that the presence of an element or thing preceded by the word "including" or "comprising" encompasses elements or objects listed after "including" or "comprising" and their equivalents, and does not exclude other elements or objects.

The present invention relates to an embedded lighting system that comprises an emergency power supply assembly suitable for use in the event of a power failure. The emergency power supply assembly can be connected to walls or ceilings, for example, providing long-term emergency lighting during power outages while also providing quick and easy installation, allowing unskilled personnel to safely and quickly complete the installation of the entire lighting system in a short amount of time without any problems, and quickly overhaul the system in case of emergency.

Figure 1:
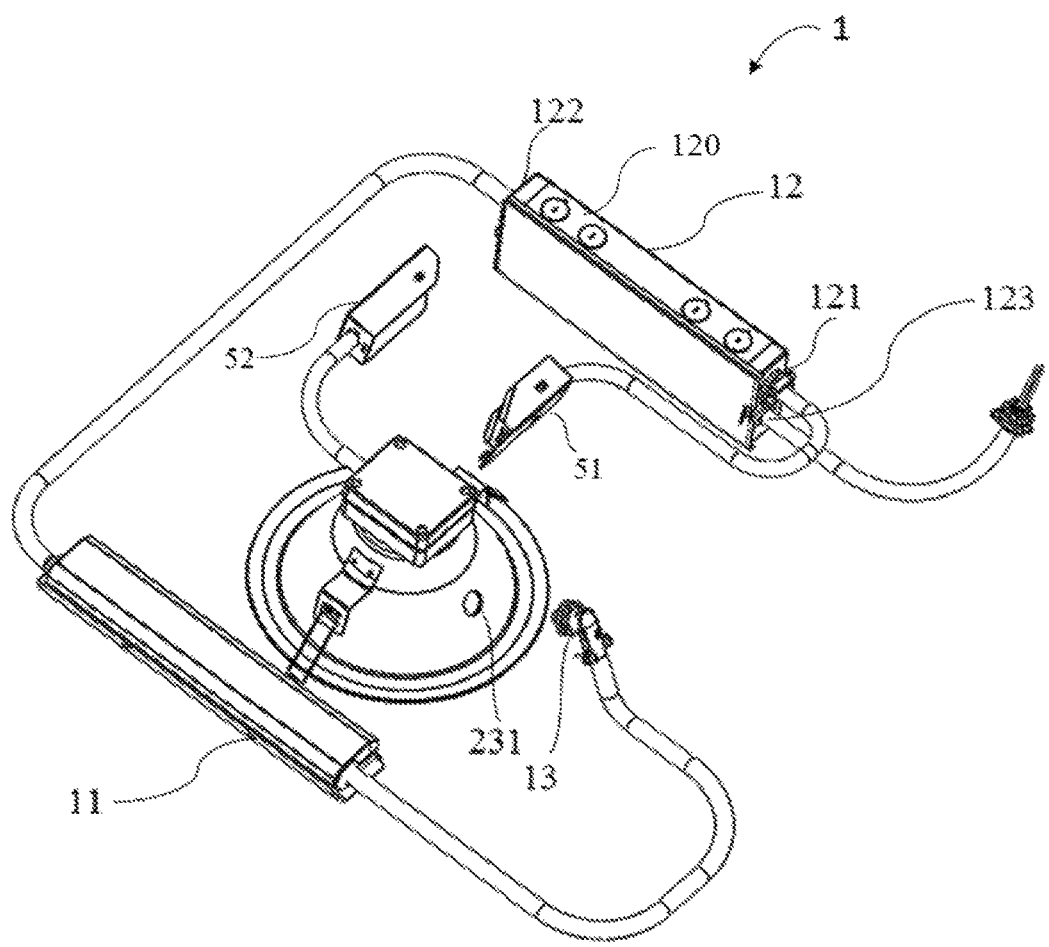
FIG. 1 is a schematic structural view of a lighting system according to a specific embodiment of the present invention.

FIG. 1 shows a schematic structural diagram of a lighting system according to an embodiment of the present invention. In conjunction with FIGS. 2 and 3, the lighting system 1 comprises an emergency power supply assembly 10 and lighting assembly 20.

Figure 2:
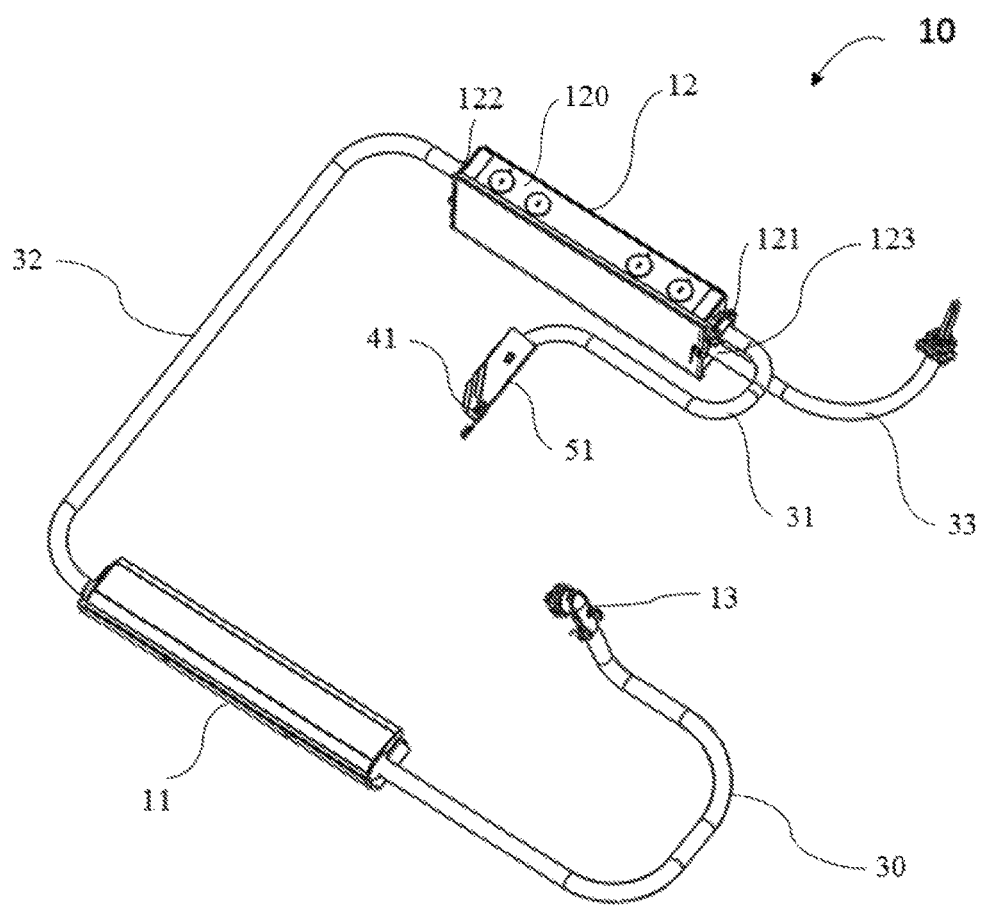
FIG. 2 is a schematic structural view of an emergency power supply assembly according to a specific embodiment of the present invention.

Referring to FIG. 2, the emergency power supply assembly 10 includes an emergency power supply 11, a test switch 13 and a splitter 12. Wherein, the emergency power supply 11 may be a battery or a battery assembly. It is understood that the battery or battery assembly may be any suitable type of battery for providing emergency power. In an embodiment of the present invention, a power source sold by IOTA Corporation is selected as the emergency power source 11.

The test switch 13 is electrically connected to the emergency power supply 11 through a flexible cable 30 for testing whether the emergency power supply 11 is in a normal working state. According to an embodiment of the present invention, the test switch 13 is a push switch, the push switch is further electrically connected to a test signal indicating device (not shown), when the push switch is pressed down, the test signal indicating device emits a color change, such as an optical signal, and indicates through the optical signal whether the emergency power source 11 is in a normal working state. It is to be understood that an audible signal may also be emitted to indicate whether the emergency power supply 11 can provide emergency power as normal by the level of its decibels.

The splitter 12 may be a housing 120 having an accommodating space which can be opened and closed, which may provide a first connecting portion 121, a second connecting portion 122 and a third connecting portion 123. The first connecting portion 121 is for connecting to the lighting assembly 20, the second connecting portion 122 is for electrically connecting to the emergency power source 11 through a flexible second cable 32, and the third connecting portion 123 is for connecting to an external power source (not shown).

The first connecting portion 121 may be a connecting hole (not shown) formed on the housing 120 of the splitter 12. The first cable 31, covering each of the functional wires, may connect the respective functional wires to the housing 120 of the splitter 12. According to an embodiment of the present invention, an end portion (not shown) of the first cable 31 connected to the connecting hole has a thread (not shown) and a limiting member (not shown) adjacent to the thread. It can be understood that the threaded end of the first cable 31 extends into the housing 120 through the connecting hole. However, the limiting member prevents the first cable 31 from extending into the housing via the connecting hole 120, and is further matched with the thread of the end of the first cable 31 by a matched thread fixing ring (not shown). That is, from inside the housing 120 of the wire distributor 12 toward the outside of the housing 120, the thread fixing ring is rotated along the thread track of the end of the first cable 31 to be in close contact with the inner wall of the housing 120 so that the first cable 31 is fixedly connected to the splitter 12.

The second connecting portion 122 may be another connecting hole (not shown) formed on the housing 120 of the splitter 12, and a second cable 32 covering each functional wire electrically connected to the emergency power source 11. The respective functional wires are fed into the housing of the splitter 12 via the other connection hole. It can be understood that the second cable 32 can be fixedly connected to the housing 120 of the splitter 12 in the same manner as the first cable 31 and the housing of the splitter 12.

The third connecting portion 123 may also be a further connecting hole (not shown) formed on the housing 120 of the splitter 12 through which the third cable 33 covering each of the functional wires is connected. The various functional wires are fed into the housing 120 of the splitter 12. It can be understood that the third cable 33 and the housing 120 of the splitter 12 can be fixedly connected to the first cable 31, the second cable 32 and the housing 120 of the splitter 12 in the same manner. In some embodiments, the fixed connection method may include the third cable 33 being fixedly connected to an additional connection hole by using an additional engagement mechanism (not shown). The engaging mechanism forms a passage (not shown) at the further connecting hole such that the third cable 33 can only extend into the housing 120 unidirectionally, when reaching a defined distance, the engaging mechanism will prevent the third cable 33 from continuing to protrude into the housing 120. In this case, the third cable 33 is also restricted from moving outside the housing 120 and the third cable 33 is fixedly connected to the additional connecting hole.

Within the housing 120 of the splitter 12, the respective functional wires respectively covered by the first cable 31, the second cable 32, and the third cable 33, will be connected one by one to form a circuit for a predetermined function. As a result, by using the splitter 12, on-site pre-wiring can be avoided.

Figure 3:
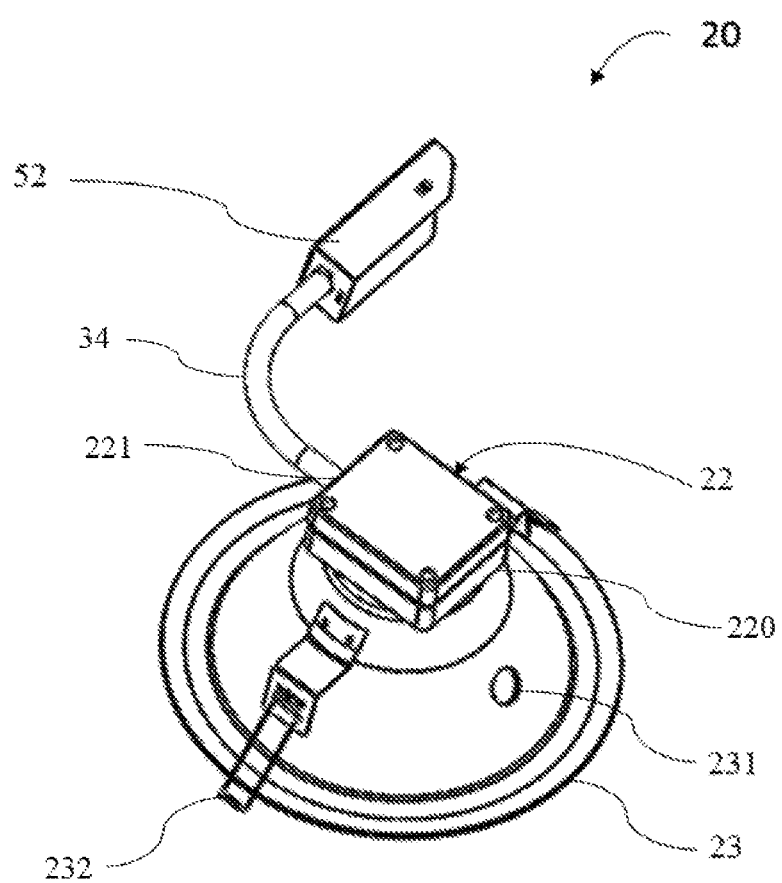
FIG. 3 is a schematic structural view of a lighting assembly according to a specific embodiment of the present invention.

Referring to FIG. 3, the lighting assembly 20 comprises a light-emitting unit (not shown), a driving unit 22 and a mounting base 23. Wherein, the light-emitting unit is used to provide a light source, which may be an LED light source.

The driving unit 22 may be connected to the emergency power supply assembly 10 for controlling the emergency power supply assembly 10 to provide emergency power to the lighting unit. According to a specific embodiment of the present invention, the driving unit 22 is integrated into a case 220 having an accommodating space. Further, the case 220 provides a driving connection portion 221 for connecting to the emergency power supply assembly 10, and specifically to the first connection portion 121 of the emergency power supply assembly 10. The driving connecting portion 221 may be a connecting hole (not shown) formed on the case 220. The driving cable 34 covering each of the function wires may be used to feed the electric wires into the case 220 via the connecting through hole, which is electrically connected to the light-emitting unit so as to form a driving control for the light-emitting unit in the power-on state. It can be understood that the driving cable 34 and the case 220 can be fixedly connected to the first cable 31, the second cable 32, the third cable 33, and the housing 120 of the splitter 12 in the same manner.

The mounting base 23 is used for mounting the light-emitting unit, which is also used for supporting the case 220. Further, a reserved hole 231 is formed in the mounting base 23 for the test switch 13 of the emergency power source to pass through. According to a specific embodiment of the present invention, the test switch 13 and the reserved hole 231 are fixedly connected by a screw thread, the push switch and the light emitting unit of the test switch 13 are both located on the same use surface of the mounting base 23. The use surface is the surface of the lighting assembly 20 viewable by the user during installation and use.

It can be understood that the mounting base 23 is further provided with a connecting component 232 for fixedly connecting with the wall or the ceiling.

Figures 4A, 4B:
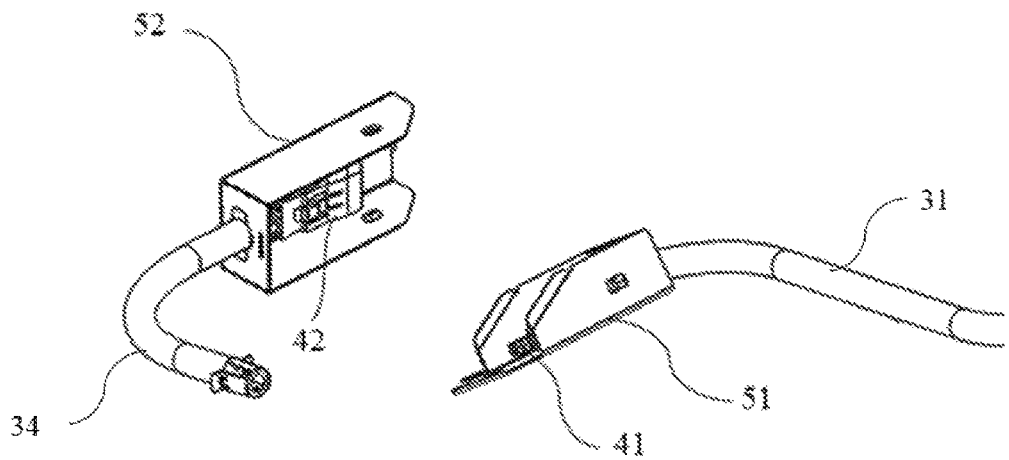
FIGS. 4a and 4b are schematic structural views of the first and second electrical connectors according to a specific embodiment of the present invention.

In conjunction with FIGS. 4a and 4b, according to the embodiment of the present invention, at least one first electrical connector 41, one second electrical connector 42 is respectively connected to each end of the first cable 31 and the driving cable 34. The at least one first electrical connector 41 and the at least one second electrical connector 42 work with each other so that a quick connection between the emergency power supply assembly 10 and the lighting assembly 20 can be formed. The first and second electrical connectors 41 and 42 may be paired plug-in electrical connectors. When the pair of first and second electrical connectors 41 and 42 is connected to each other, circuits with different functions may be constructed, such as; mains and ground circuits including life wire, earth wire and neutral wire; a backup power drive and dimming circuits including a positive/negative connection of a light-emitting unit; a driver output/input line and a dimming line. It can be understood that, the paired first and second electrical connectors 41 and 42 can be distinguished by different identifiers, such as colors and icons, and when installed on-site, the user only needs to connect each pair of the first and second electrical connectors 41 and 42, which are distinguished in color and so on, and can be connected one by one, thereby eliminating the need for complex and professional wiring operations on-site.

Figures 5A, 5B:
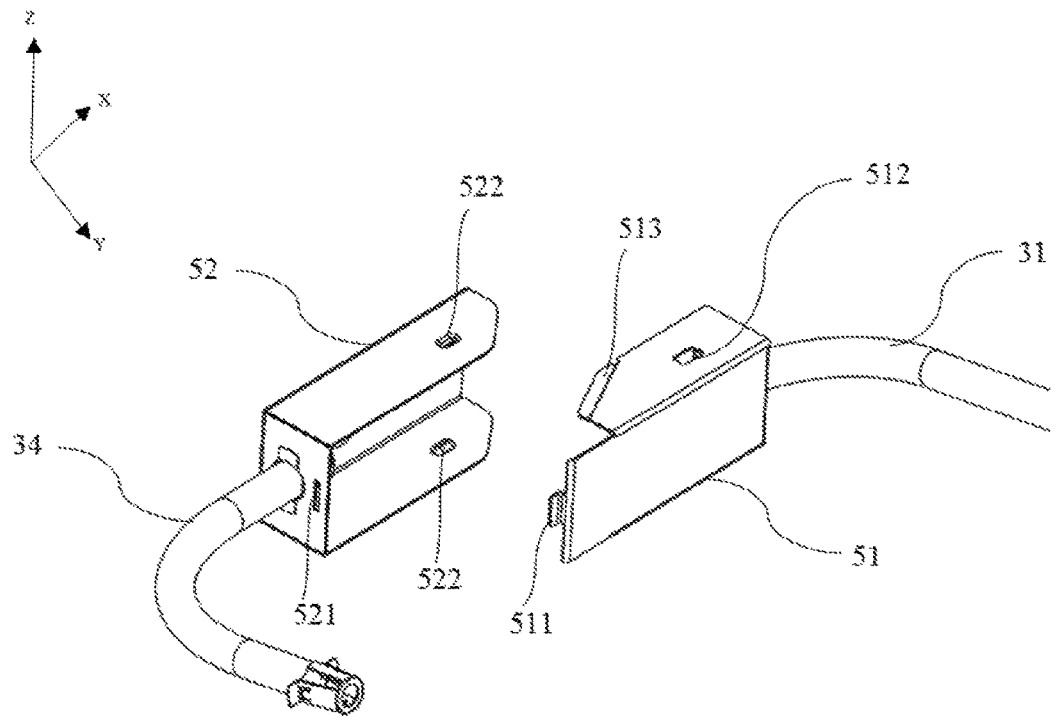
FIGS. 5a and 5b are schematic structural views of the first and second housings according to a specific embodiment of the present invention.

Referring to FIGS. 5a and 5b, the first housing 51 and the second housing 52 are respectively connected to the same ends of the first cable 31 and the driving cable 34. The first housing 51 and the second housing 52 work with each other to form a fixed connection there between. After the first housing 51 and the second housing 52 are fixedly connected to each other, an accommodation space is formed between the first housing 51 and the second housing 52. Each first and second electrical connectors 41, 42 are received in the receiving space to provide protection for the first and second electrical connectors 41, 42 from damages from the adverse environment on the ceiling or in the wall.

According to the embodiment of the present invention, the first housing 51 and the second housing 52 are fixedly connected to each other by at least one engaging mechanism. The engaging mechanism comprises: a protruding portion 511 located on the first housing 51 and a receiving portion 521 located on the second housing 52 and engaged therewith. Specifically, the protruding portion 511 extends from a side edge of the first housing 51 to form an L-shaped insert, and the receiving portion 521 is an opening formed in a sidewall of the second housing 52 for receiving the insert.

The engaging mechanism further comprises a concave portion 512 on the first housing 51 and a protruding portion 522 on the second housing 52 that mates with the concave portion 512. Specifically, the protrusions 522 are formed on two opposite side walls of the second housing 52 and protrude toward the inner space of the second housing 52, the concave portions 512 are formed on the two opposite side walls of the first housing 51, which are opened for receiving the protrusion.

The engaging mechanism further includes a guiding portion 513, which is specifically an extending portion extending from an edge of two opposite side walls of the first housing 51 toward the connecting direction of the second housing 52.

When the first housing 51 and the second housing 52 are connected to each other via the guide portion 513, the outsides of the two opposite side walls of the first housing 51 fit the inside of the two opposite side walls of the second housing 52 such that the inside of the two opposite side walls of the first housing 51 make the case 51 gradually cover the two opposite side walls of the second housing 52. During this process, the protruding portion 511 of the first housing 51 extends into the receiving portion 521 of the second housing 52 which is engaged therewith, to form a fixed connection at the same end of the first housing 51 and the second housing 52 so as to limit the distance between the first housing 51 and the second housing 52 on the Z axis and the Y axis. Then, the protruding portion 522 of the second housing 52 is fixed to the two opposite sidewalls of the first housing 51 and the second housing 52 by extending into the concave portion 512 of the first housing 51 to be engaged therewith, so as to further limit the displacement between the first housing 51 and the second housing 52 in the X-axis and the Y-axis in the Figure, thereby forming a reliable fixed connection between the first housing 51 and the second housing 52.

It can be understood that the guiding portion 513 can be located on the first housing 51 or on the second housing 52. The positions of the concave portion 512 and the protruding portion 521 may also be exchanged with each other. That is, the concave portion 512 may be located on the second housing 52, and correspondingly, the protruding portion 521 may be located on the first housing 51.

According to a specific embodiment of the present invention, the installation method of the lighting system 1 comprises the following steps:

Each second electrical connector 42 of the lighting assembly 20 is respectively connected to each first electrical connector 41 of the corresponding power supply assembly 10 to form at least an emergency power drive circuit, an emergency power supply test circuit, a dimming circuit and a wall switch control circuit; connecting the emergency power supply assembly 10 to an external power supply to form at least a ground circuit, a mains supply circuit, a dimming circuit and a wall switch control circuit; placing the emergency power supply assembly 10 in a wall or a ceiling; and mounting the lighting assembly 20 to a wall or ceiling.

The mounting method further comprises: fixedly connecting the first housing 51 and the second housing 52 by the engaging mechanism to receive the first and second electrical connectors 41, 42 therein. The engaging structure comprises an inserting portion and a receiving portion that are respectively located on the first housing 51 and the second housing 52, the protruding portion 521 and the concaved portion 512, and the guiding portion 513 of the first housing 51 or the second housing 52.

The installation method further comprises: mounting the test switch 13 of the emergency power supply assembly 10 to the lighting assembly 20 via a reserved hole 231 on the lighting assembly 20.

While the present invention has been described in detail with reference to specific embodiments thereof, it will be understood by those skilled in the art that many modifications and variations can be made in the present invention. It is, therefore, to be understood that the appended claims are intended to cover all such modifications and variations insofar as they are within the true spirit and scope of the invention.

What is claimed is:

1. A lighting assembly, comprising:
   a lighting element for providing with light source;
   a driving element, connecting with a backup power source assembly, for controlling the backup power source to provide power source to the lighting element;
   at least one electrical connector configured to connect with the first driving element so as to form a quick connection between the driving element and a backup power source assembly;
   a mounting base having a pre-drilled hole for allowing a testing switch to pass through therein.

2. The lighting assembly according to claim 1, further comprising:
   a housing for containing the at least one electrical connector.

3. An installing method for a lighting system,
   the lighting system comprising:
      a backup power source assembly comprising a backup power source for providing power;
      a lighting assembly comprising a lighting element for providing light; and
      at least one first electrical connector for connecting with the backup power source assembly and at least one second electrical connector for connecting with the lighting assembly;
      wherein the at least one first electrical connector mates with the at least one second electrical connector so as to form a quick connection between the backup power source assembly and the lighting assembly;
   the installing method comprising:
      connecting each second electrical connector of the lighting assembly with each corresponding first electrical connector of the backup power source assembly;
      connecting the backup power source assembly to an external power;
      inserting the backup power source assembly into a wall or ceiling; and
      installing the lighting assembly onto the wall or ceiling.

4. The method according to claim 3, further comprising:
   installing a test switch of the backup power source assembly onto the lighting assembly through a pre-drilled hole thereon.

5. The method according to claim 3, further comprising:
   distributing wires that can generate different functional circuits in a wiring distribution.

* * * * *